June 7, 1966  D. R. LOCKE ETAL  3,255,435
PORTABLE ELECTRICAL APPLIANCE
Filed Jan. 12, 1962  3 Sheets-Sheet 1

INVENTORS.
DAVID R. LOCKE
RONALD B. WUENNEMANN
ROBERT J. TOLMIE
BY C. R. Miranda
ATTORNEY

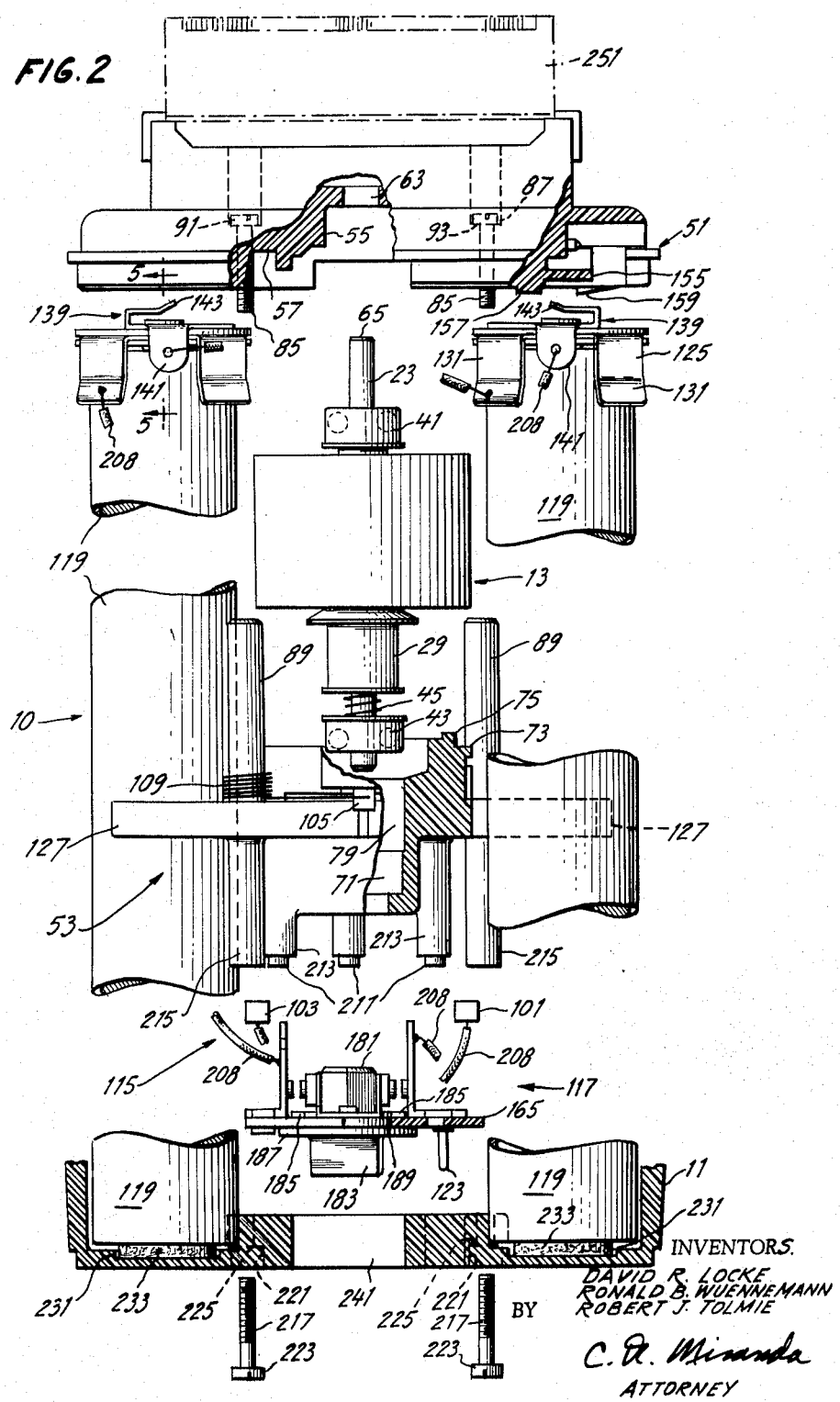

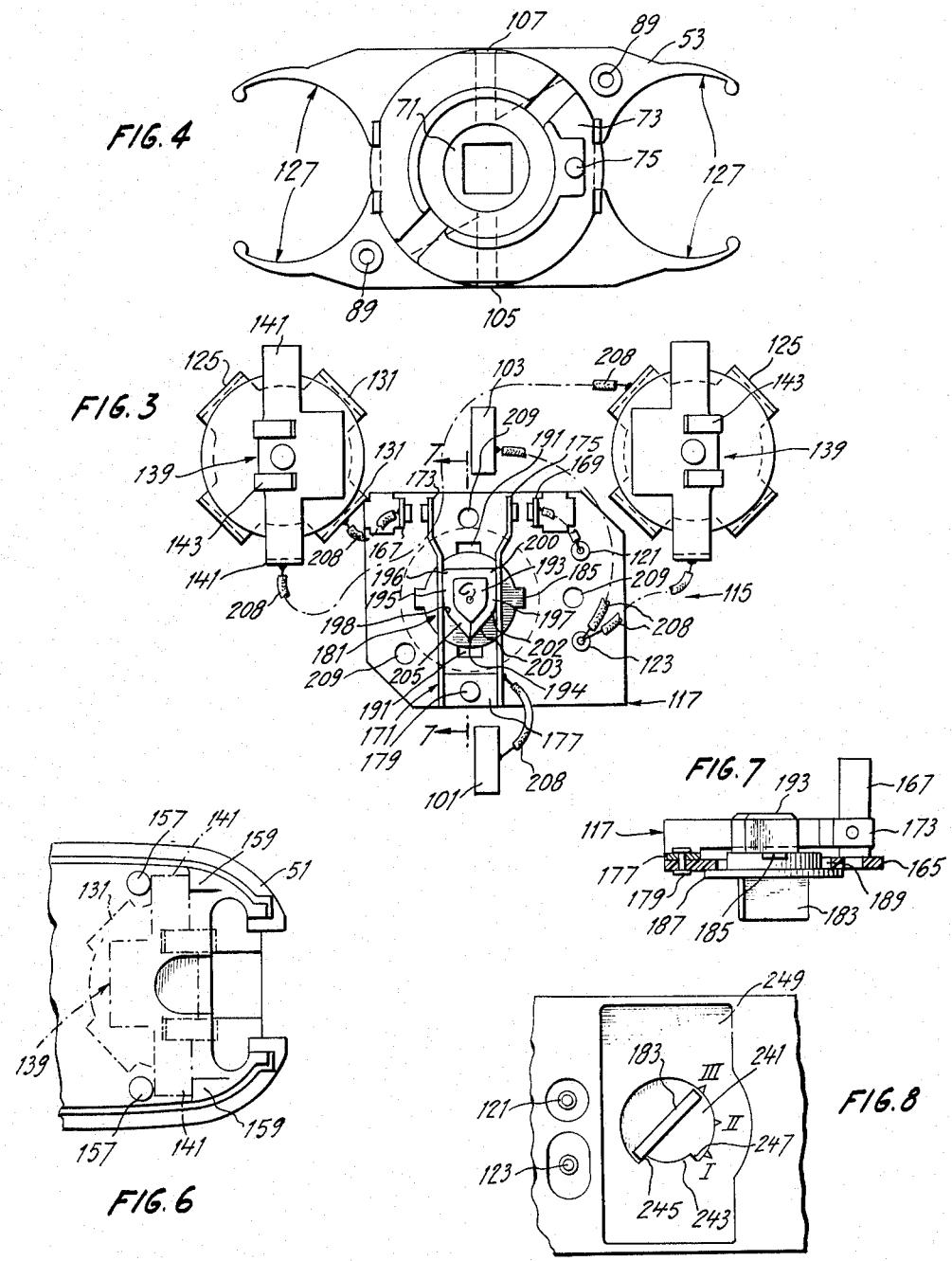

United States Patent Office 3,255,435
Patented June 7, 1966

3,255,435
PORTABLE ELECTRICAL APPLIANCE
David R. Locke, Bridgeport, and Ronald B. Wuennemann and Robert J. Tolmie, Fairfield, Conn., assignors to Sperry Rand Corporation, New York, N.Y., a corporation of Delaware
Filed Jan. 12, 1962, Ser. No. 165,819
8 Claims. (Cl. 310—47)

This invention relates to portable motor operated electrical appliances and power tools and more particularly to such appliances and power tools which are selectively operated from a self-contained power source and/or an external power source.

Portable motor operated electrical appliances and power tools which have a self-contained power source inherently must possess the characteristic of compactness in order to be of maximum use to the purchaser or user. Compactness of a product generally results in manifold problems of manufacture and assembly which in turn are reflected in the price and/or the servicing of the product. Since portable appliances and tools of this type are sold to the public generally rather than only to a restricted group or class, such as industrial users, price and service become major considerations to the manufacturer of such products.

An object of this invention is to provide a novel compact portable motor operated electrical appliance or power tool which is operated from a self-contained power source and/or an external power source.

Another object is to provide a novel mounting structure for positioning the component parts of a portable motor operated electrical appliance or power tool in a confined area.

Another object is to provide a novel structure for accommodating the essential operating parts of a portable motor operated electrical appliance or power tool for ready and easy assembly.

Still another object is to provide a novel structural assemblage for a portable motor operated electrical appliance or power tool, which assemblage may be quickly and easily disassembled for service and repair and then quickly and easily reassembled.

A further object is to provide a novel portable motor operated electrical appliance or power tool having a motor assembly comprising a stator and armature, and an electrical assembly comprising motor brushes, a self-contained source of power, connections for an external source of power, and switch means, the motor assembly and electrical assembly being insertable and removable as units.

Still another object is to provide a novel electrical assembly comprising leads, battery holders, terminals, a multi-position switch, and friction type attaching members for coupling the electrical assembly as an interconnected assembly to a utilizing device.

Still another object is to provide a novel multi-position electrical switch unit having a movable contact and a selectively positionable contact actuator with the movable contact and contact actuator also coacting as a detent to prevent undesired movement of the contact actuator.

A still further object is to provide a novel battery holder assembly.

A still further object is to provide a novel battery holder assembly having a battery holding element which also serves as a contact for one of the battery terminals.

The present invention contemplates a compact portable electrical appliance or power tool having a novel structural assemblage for mounting a motor, batteries and a selectively positionable switch. The structural assemblage comprises a pair of end-bells upon which all the component parts are assembled. The motor is rotatably mounted between the end-bells which are secured together by the use of only two threaded members. The two end-bells are provided with structure to facilitate positioning of one end-bell with respect to the other end-bell. One of the end-bells is provided with integral structure for receiving snap-on clips which in turn position battery holders. The other end-bell has integral resilient arms for gripping a battery as well as integral structure to frictionally hold a terminal board, which carries a selectively positionable switch. The switch settings determine the mode of operation of the device.

Other objects and advantages of the invention, in its details of construction and arrangement of parts, will be apparent from a consideration of the following specification and accompanying drawings wherein:

FIG. 2 is an exploded, elevational view of the device shown in FIG. 1;

FIG. 3 is a plan view of the electrical assembly;

FIG. 4 is a plan view of the upper surface of the lower end-bell;

FIG. 6 is a sectional plan view of the end of an upper end-bell showing the battery holder assembly positioned thereon;

FIG. 7 is a sectional view of the switch taken along lines 7—7 of FIG. 3, and

FIG. 8 is a partial view of the bottom of the assembled device.

Figure 1:
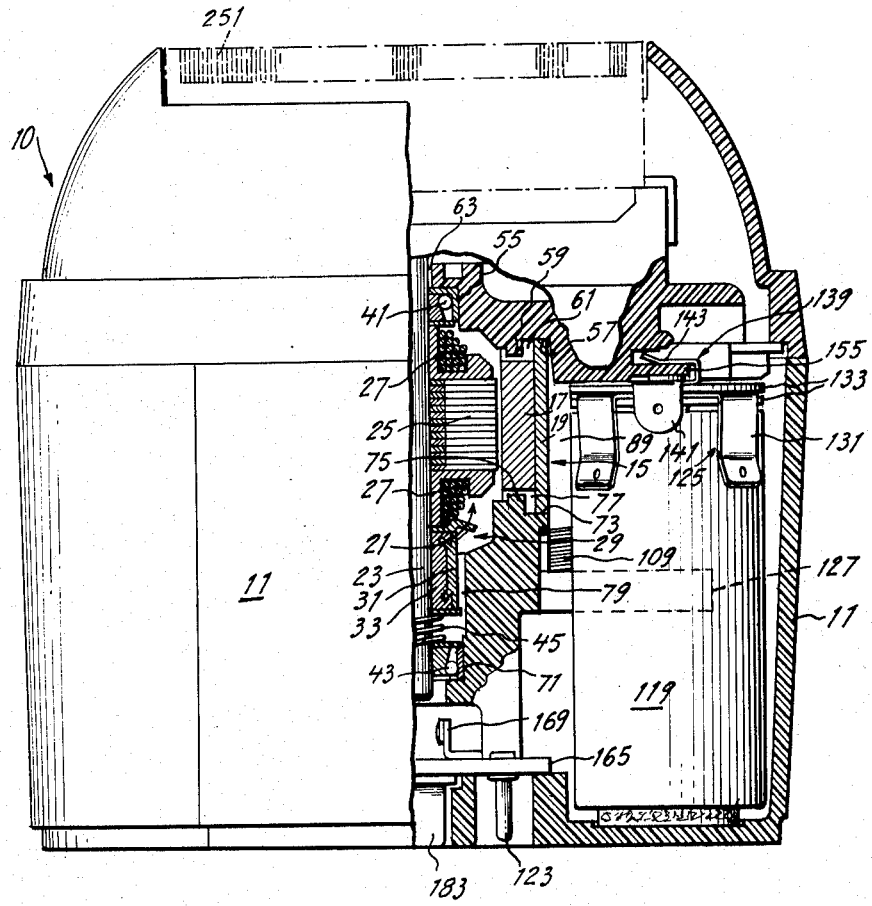
FIG. 1 is an elevational view of the assembled device with a portion thereof in section.

Referring now to the drawings for a more detailed description of the present invention an embodiment thereof is incorporated in an electric dry shaver generally designated by the numeral 10. It should be understood however, that the hereinafter described application of the invention to an electric shaver is for purposes of illustration only inasmuch as the subject invention finds ready application to many different electrical appliances or power tools which are motor operated. A casing 11 of electric shaver 10 houses a low voltage D.C. motor assembly 13. The motor assembly 13 may be of any suitable type as long as it conforms to the power requirements and size restrictions of the particular appliance or power tool.

In the preferred embodiment the motor assembly 13 utilizes a cylindrical stator 15 (FIG. 1) which comprises an innner cylindrical field member 17 and an outer split ring 19, interconnected by a key and slot (not shown) to prevent relative rotation. An armature 21 has a shaft 23 upon which is mounted a laminated body 25 with coil windings 27. The coil windings 27 are electrically connected to a commutator 29 formed of a plurality of electrically insulated conductive segments 31 set in a molded plastic body 33.

The motor assembly 13 is mounted for rotation in upper bearing assembly 41 and lower bearing assembly 43. A spring 45 is mounted on armature shaft 23 between commutator 29 and lower bearing assembly 43 to bias the shaft in the direction of bearing assembly 41.

The motor assembly 13 and bearing assemblies 41 and 43 are seated in an upper supporting end bell member 51 and a lower supporting end bell member 53. The upper end-bell 51 has integrally formed therein a bearing seat 55 and a stator seat 57. The stator seat 57 is further provided with a key 59 adapted for seating in a slot 61 of tubular stator 15 to prevent rotational movement of the tubular stator 15 with respect to the end-bells 51 and 53. The upper end-bell 51 also has an aperture 63 for receiving the end 65 of armature shaft 23.

The lower end-bell has integrally formed therein a bearing seat 71, and a stator seat 73. The stator seat 73 is further provided with a key 75 adapted for seating in a slot 77 of tubular stator 15 to prevent rotational movement of the tubular stator 15 with respect to the end-bells 51 and 53. The lower end-bell 53 is provided with a commutator recess 79.

Upper end-bell 51 and lower end-bell 53 are secured together by two threaded members 85 (FIGS. 1 and 2) which are accommodated within apertures 87 (FIG. 2) formed in the upper end-bell 51. The threaded portions of members 85 are threaded into posts 89, integrally formed on the lower end-bell 53, until a head 91 of the threaded member 85 abuts against a shoulder 93 formed in the upper end-bell 51. Posts 89 also serve to space the upper end-bell 51 from the lower end-bell 53 when assembled. The posts 89 may either be internally threaded or provided with apertures having smooth walls whereby the threaded members are of the self tapping variety. The upper end-bell 51 and lower end-bell 53 are preferably formed of a material having non-magnetic and non-conductive properties such as plastic.

The motor assembly 13 receives its electrical energy through brushes 101 and 103 (FIG. 3) which engage commutator 29 and are slidably disposed in passageways 105 and 107 (FIG. 4) in lower end-bell 53. Springs 109 (FIGS. 1 and 2) are mounted on the posts 89 of the lower end-bell 53 and bias the brushes 101 and 103 into engagement with the commutator 29.

Brushes 101 and 103 are part of an electrical harness assembly 115. The electrical harness assembly 115 (FIGS. 2 and 3) provides a switch 117 for selectively interconnecting the brushes 101 and 103 to either a self-contained source of power as for example batteries 119 or to an external D.C. source through terminals 121 and 123.

Figure 5:
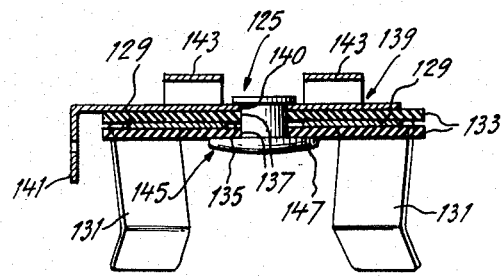
FIG. 5 is an elevational view in partial section of the battery holder assembly.

The batteries 119 are held in place by battery holder assemblies 125 and resilient arms 127 integrally formed on the lower end-bell 53. The battery holder assembly 125 serves the dual function of positioning the battery and making contact with the battery terminals. To accomplish this a battery holder 129 (FIG. 5) of electrically conductive material has formed thereon prong fingers 131 adapted to firmly grasp a battery therebetween. An aperture 135 is formed in the battery holder and positioned above and below the latter are two insulators 133. The two insulators 133 are provided with center apertures 137 which are of smaller diameter than the aperture 135 formed in the center of the battery holder 129.

A terminal clip 139 having terminal portions 141 and spring clip portions 143 is positioned above the insulators 133 and battery holder 129. The terminal clip 139 has an aperture 140 formed therein. A rivet 145 with its head 147 positioned below the lower insulator 133, is inserted into the apertures 135, 137 and 140 with the center of the rivet 145 and apertures 135, 137 and 140 aligned. The small diameter of the apertures 137 in the insulators 133 will space the rivet 145 from the battery holder 129. The rivet is peened over against terminal clip 139 interconnecting the rivet 145, battery holder 125, insulators 133 and terminal clip 139 to provide a secure assembly.

The battery holder assembly 125 is constructed to be used with a battery 119 of the cylindrical type. The battery has a cap on the top thereof serving as one terminal. The sides of the battery serve as the second terminal. When seated in the battery holder assembly 125 the cap of the battery contacts the rivet 145 and the sides of the battery are in contact with prongs 131.

A ledge 155 and retaining lugs 157, 159 (FIGS. 2 and 6) are integrally formed on upper end bell 51 and serve to position the battery holder assembly 125. The retaining lugs are spaced apart a distance equal to the longitudinal dimension of terminal portion 141 (as seen in FIG. 6) of the terminal clip 139. Retaining lugs 159 are cam or wedge shaped (FIG. 2) to spread the spring portion 143 of the terminal clip 139 to facilitate attachment of the battery holder assembly 125 to the upper end-bell 51.

The terminals 121, 123 are mounted on a terminal board 165 of an electrically non-conductive material. Also mounted on terminal board 165 are stationary contacts 167, 169 (FIG. 3) and a movable contact 171. The movable contact 171 has two spaced leaf spring contact arms 173, 175 interconnected at one end by a conductive member 177 and conductive member 177 is secured to the terminal board 165 by a rivet 179, or any other suitable securing means. The movable contact arms 173, 175 by their construction are biased towards each other.

A contact actuator 181 (FIGS. 2 and 3) is rotatably carried by the terminal board 165 and is positioned between the two leaf spring contact arms 173, 175 to space same and to engage either of said leaf spring contact arms 173, 175 with their respective stationary contacts 167, 169, respectively. The contact actuator 181 has integrally formed therewith a flat piece 183 (FIGS. 1 and 7) which may be manually grasped and turned to rotate contact actuator 181. Actuator 181 has lip members 185 and a flange 187 (FIGS. 3 and 7) formed thereon. The terminal board 165 has an aperture 189 and slots 191 formed therein. With the lip member 185 aligned with the slots 191 the actuator 181 may be inserted up from the bottom of the terminal board 165 until the flange 187 abuts against the bottom of the terminal board 165. A slight rotation will place the lip members 185 on the top surface of the terminal board 165. The lip members 185 and flange 187 coacting with the terminal board 165 will constrain the contact actuator 181 to rotational movement with respect to the terminal board 165.

A cam 193 (FIG. 3) is formed on the upper portion of contact actuator 181 and has a pentagonal configuration which may be considered to include a rectangle and a triangle with a side of the rectangle common with the base of the triangle. An apex 194 of the triangular portion of cam 193 is adjacent securing element 179 when contact actuator 181 is properly set to its center position (FIG. 3) on terminal board 165. In this center position sides 195 and 197 of the rectangular portion of cam 193 are engaged by leaf spring contact arms 173 and 175, respectively. The coaction between the leaf spring contact arms 173 and 175 and sides 195 and 197 detents the cam 193 and thereby contact actuator 181 in the center position (FIG. 3).

Corners 196 and 198 of the rectangular portion of cam 193 engage leaf spring contact arm 173. Corners 200 and 202 of the rectangular portion of cam 193 engage leaf spring contact arm 175. The radial distance of corners 196 and 200 from the center of rotation "c" of cam 193 is greater than the radial distance of corners 198 and 202 from the center of rotation "c" of cam 193.

When the contact actuator 181 is rotated counterclockwise from the center position, as seen in FIG. 3, corner 196 will move leaf spring contact arm 173 towards stationary contact 167 and corner 202 will move leaf spring contact arm 175 towards stationary contact 169. The radial distance of corner 196 from the center of rotation "c" of cam 193 is sufficient to move leaf spring contact 173 into engagement with stationary contact 167. However, the radial distance of corner 202 from the center of rotation "c" of cam 193 is insufficient to move leaf spring contact 175 into engagement with stationary contact 169. When contact actuator 181 has been rotated (counterclockwise) a sufficient distance, a leg 203 of the triangular portion of cam 193 will be engaged by leaf spring contact arm 175 to detent the contact actuator 181 in its counterclockwise position.

When the contact actuator 181 is rotated clockwise from the center position, as seen in FIG. 3, corner 200 will move leaf spring contact arm 175 towards stationary contact 169 and corner 198 will move leaf spring contact arm 173 towards stationary contact 167. The radial distance of corner 200 from the center of rotation "c" of cam 193 is sufficient to move leaf spring contact 175 into engagement with stationary contact 169. However, the radial distance of corner 198 from the center of rotation "c" of cam 193 is insufficient to move leaf spring contact 173 into engagement with stationary contact 167. When contact actuator 181 has been rotated (clockwise) a sufficient distance, a leg 205 of the triangular portion of cam 193 will be engaged by leaf spring contact arm 173 to detent the contact actuator 181 in its clockwise position.

The brushes 101, 103 battery holder assemblies 125, terminals 121, 123, stationary contacts 167, 169 and movable contact 171 are all electrically interconnected by conductive members 208 so that rotation of the contact actuator 181 from its center position in one direction will complete a circuit from the battery holder assemblies 125 to the brushes 101, 103 and the rotation of the contact actuator 181 from its center position in the other direction will complete a circuit from the terminals 121, 123 to the brushes 101, 103. If desired provision may be made for a recharging circuit for the batteries 119.

The terminal board 165 has three apertures 209 formed thereon. The diameter of the apertures 209 is chosen to provide a friction fit between the sides of the apertures 209 and three lugs 211 on the ends of posts 213 of the lower end-bell 53.

Also provided on the lower end-bell 53 are two posts 215. The ends of post 215 are hollow and receive threaded members 217. The ends of posts 215 may be threaded or not, but if not threaded, self-tapping threaded members are used.

The structure described up to this point is accommodated within casing 11 which has formed therein openings 221 through which the threaded portion of threaded members 217 pass when screwed into posts 215. When the heads 223 of threaded members 217 abut against shoulders 225 on the casing 219 casing 11 will be securely positioned to house all the assembled components of the device.

Casing 11 has formed therein recesses 231 which position pads 233 attached to the lower ends of batteries 119. The pads 233 are made from a nonconductive resilient substance such as foam rubber. Also formed in the bottom of casing 219 is an aperture 241 (FIGS. 2 and 8) through which flat piece 183 of the contact actuator 181 extends when the device is assembled. A lug 243 is formed on the inner surface of the aperture 241 and includes a pair of shoulders 245, 247 which coact with piece 183 to restrict rotational movement of the contact actuator 181.

A plate 249 is attached to the bottom of the casing by suitable means. The plate 249 has markings thereon to indicate the positions of switch 117. If preferred the markings may be made directly on the surface of casing 219.

Position II corresponds to the center position of contact actuator 181 (FIG. 3), while positions I and III correspond respectively to the counterclockwise and clockwise positions of counter actuator 181 as hereinbefore described with respect to FIG. 3.

To assemble the device the bearing assembly 43 is positioned in its seat 71 on the lower end-bell 53. With spring 45 in place on the armature shaft 23 the motor assembly 13 is placed on the lower end-bell 53. The tubular stator 15 is easily positioned in its seat 73. A slight rotation of the tubular stator 15 may be required to align the key 75 on the lower end-bell 53 with the slot 77 in the tubular stator 15. Springs 109 are placed on posts 89. The bearing assembly 41 is next seated in its seat 55 in the upper end-bell 51 and the upper end-bell 51 is secured to the lower end-bell 53 by use of the two threaded members 85.

The electrical harness assembly 115, preassembled as a unit, is attached to the upper end-bell 51 by snapping the terminal clips 139 over ledges 155. The retaining lugs 157, 159 positioning the terminal portion 141 therebetween. The terminal board 165 is then snapped onto the posts 213 on the lower end-bell 53. Brushes 101 and 103 are inserted into passageways 105, 107 the springs 109 set to bias the brushes 101, 103 into engagement with the commutator 29.

Each battery 119 is inserted into its battery holder assembly 125 and between the resilient arms 127 on the lower end-bell 53. If the battery 119 should be incorrectly inserted, the pad 233 on the bottom thereof will engage the rivet 147 and thereby provide an open circuit which will prevent damage to the device.

Casing 11 is positioned over the components and secured to posts 215 on the lower end-bell 53 by the use of threaded members 217.

The cutter shaver head 251 is next attached to the upper end-bell 51 and the end 65 of the armature shaft 23. The upper end-bell 51 has the proper structure to accommodate the shaver head. If servicing is required, the casing 11 is removed and the entire operating mechanism is still properly positioned and operable without the casing. This facilitates observation of the various parts while the device is running.

The batteries 119 may be quickly removed and replaced without breaking any solder joints or unscrewing any terminals.

The entire electrical harness assembly 115 may be removed if required by merely extracting the brushes 101, 103 and removing the battery holder assemblies 125 and terminal board 165.

It is now apparent that the present invention provides a unique assemblage which renders possible easy assembly and disassembly without sacrificing compactness and without a multi-part complicated mounting structure.

It is understood that although we have shown the preferred form of our invention, that various modifications may be made in the details thereof without departing from its spirit as comprehended by the following claims.

What is claimed is:

1. A portable electric appliance of the class described, comprising
   (a) a casing,
   (b) a pair of spaced support members arranged within said casing,
   (c) an electric motor having opposite end portions seated in said spaced support members,
   (d) means securing said support members together with said motor positioned therebetween,
   (e) at least one electric battery in said casing to provide a source of electrical energy to drive said motor,
   (f) a detachable electrical harness assembly unit including contact means for electrically connecting said electric battery to said motor and switch means for controlling operation of said motor, and
   (g) said electrical harness assembly including releasable frictional attaching means adapted for attachment to said support members to detachably mount said electrical assembly as a unit on said spaced support members.

2. The device of claim 1 wherein said electrical harness assembly unit includes a clamp member having portions mounting said battery and means interconnecting said clamp member with said switch means, and wherein said releasable attaching means includes clip means on said clamp member attached to one of the support members to detachably mount said clamp member and battery on said one support member, and said attaching means further including first holding means on said switch means cooperating with second holding means on the other support member to detachably mount said switch means on said other support member.

3. A portable electric appliance of the class described, comprising
   (a) a casing,
   (b) a pair of spaced support members arranged within said casing,
   (c) an electric motor having opposite end portions seated in said spaced members and provided with a rotatable shaft extending through one of said support members,
(d) means securing said support members together with said motor positioned therebetween,
(e) at least one electric battery in said casing to provide a source of electrical energy to drive said motor,
(f) positioning means on one of said spaced support members for positioning said battery adjacent said motor,
(g) a detachable electrical harness assembly unit for electrically connecting said motor to said battery adapted for attachment as a unit to said support members,
(h) said electrical harness assembly unit including a clamp member having a plurality of clamping fingers gripping said at least one battery,
(i) said clamp member provided with a clip portion attached to one of said support members.
(j) said electrical assembly further including switch means operable to effect connection and disconnection of said battery to said motor,
(k) first holding means on said switch means,
(l) second holding means on the other of said support members cooperating with said first holding means to detachably mount said switch means on said other support member.

4. A portable electric appliance of the class described, comprising
(a) a casing,
(b) a pair of spaced support members arranged within said casing,
(c) an electric motor having opposite end portions seated in said spaced support members,
(d) means securing said support members together with said motor positioned therebetween,
(e) at least one electric battery in said casing to provide a source of electrical energy to drive said motor,
(f) a detachable electrical harness assembly unit for electrically connecting said battery to said motor adapted for attachment as a unit to said support members,
(g) said electrical assembly including a clamp member having portions detachably gripping said at least one battery,
(h) said clamp member provided with a clip portion attached to one of said support members to position and hold said clamp member and battery adjacent said motor,
(i) said electrical harness assembly further including switch means operable to effect connection and disconnection of said battery to said motor,
(j) first holding means on said switch means, and
(k) second holding means on the other of said support members cooperating with said first holding means to frictionally hold said switch means on said other support member.

5. The device of claim 4 wherein said switch means further includes terminal members arapted for interconnection with a power cord, an actuator member accessible at the exterior of said casing and being selectively settable to connect said battery to said motor and said terminals to said motor.

6. The device of claim 4 wherein said at least one electric battery is a rechargable battery.

7. A portable electric appliance of the class described, comprising
(a) a casing,
(b) a pair of spaced support members arranged within said casing,
(c) an electric motor having opposite end portions seated in said spaced support members,
(d) means securing said support members together with said motor positioned therebetween,
(e) at least one electric battery to provide a source of electrical energy to drive said motor,
(f) an electrical harness assembly unit for electrically connecting said battery to said motor and adapted for attachment as a unit to said support members,
(g) said electrical harness assembly unit including a clamp member having portions gripping said at least one battery,
(h) a clip portion on said clamp member attached to one of said support members to mount said clamp member on said one of said support members and position said battery adjacent said motor,
(i) said electrical harness assembly unit further including switch means operable to effect connection and disconnection of said battery to said motor,
(j) means connecting said switch means to said clamp member,
(k) said switch means comprising a terminal board, contact means on said terminal board and an actuating member accessible at the exterior of the casing and operable to effect operation of the contact means for connection and disconnection of said battery to said motor, and
(l) first holding means on said terminal board cooperating with said second holding means on said other support member to frictionally mount said switch means on said other support member.

8. The device of claim 7 wherein said first holding means includes apertures in said terminal board and said second holding means includes post members on said other support member adapted for insertion in said apertures of said terminal board to frictionally hold said switch means on the other support member.

References Cited by the Examiner

UNITED STATES PATENTS

| | | | |
|---|---|---|---|
| 2,406,389 | 8/1946 | Lee | 310—50 |
| 2,456,571 | 12/1948 | Turner | 310—50 |
| 2,525,839 | 10/1950 | Sparklin | 310—50 |
| 2,532,823 | 12/1950 | Schumann | 310—50 |
| 2,600,652 | 6/1952 | Huck | 200—6 |
| 2,719,945 | 10/1955 | Tull | 310—50 |
| 2,773,306 | 12/1956 | Ranson | 310—47 |
| 2,793,258 | 5/1957 | Engelage | 200—6 |
| 2,829,285 | 4/1958 | Steiner | 310—50 |
| 2,861,578 | 11/1958 | Thompson | 310—50 |
| 2,867,039 | 1/1959 | Zach | 310—47 |
| 2,963,598 | 12/1960 | Kent | 310—50 |
| 2,983,778 | 5/1961 | Munse | 136—173 |
| 3,000,999 | 9/1961 | Schlan | 136—173 |
| 3,035,191 | 5/1962 | Kent | 310—50 |
| 3,043,996 | 7/1962 | Hartwig | 310—47 |
| 3,079,510 | 2/1963 | Hartwig | 310—47 |
| 3,089,071 | 5/1963 | Hartwig | 310—47 |
| 3,109,238 | 11/1963 | Marks | 310—50 |

FOREIGN PATENTS

| | | |
|---|---|---|
| 1,051,163 | 2/1959 | Germany. |
| 440,246 | 12/1935 | Great Britain. |
| 744,948 | 2/1956 | Great Britain. |
| 317,924 | 3/1934 | Italy. |

ORIS L. RADER, *Primary Examiner.*

MILTON O. HIRSHFIELD, *Examiner.*

J. W. GIBBS, *Assistant Examiner.*